United States Patent
Beckmann

(10) Patent No.: US 7,024,664 B2
(45) Date of Patent: Apr. 4, 2006

(54) SYMBOLIC ASSEMBLY LANGUAGE

(75) Inventor: Carl J. Beckmann, Newton, MA (US)

(73) Assignee: Intel Corporation, Santa Clara, CA (US)

(*) Notice: Subject to any disclaimer, the term of this patent is extended or adjusted under 35 U.S.C. 154(b) by 643 days.

(21) Appl. No.: 10/128,754

(22) Filed: Apr. 22, 2002

(65) Prior Publication Data

US 2003/0200529 A1    Oct. 23, 2003

(51) Int. Cl.
G06F 9/45   (2006.01)

(52) U.S. Cl. .................... 717/136; 717/114; 717/140

(58) Field of Classification Search ............. 717/102, 717/121, 104, 107, 136, 137–140, 114, 162, 717/160
See application file for complete search history.

(56) References Cited

U.S. PATENT DOCUMENTS

| | | | | | |
|---|---|---|---|---|---|
| 4,636,940 | A | * | 1/1987 | Goodwin, Jr. | 717/128 |
| 4,667,290 | A | * | 5/1987 | Goss et al. | 717/147 |
| 4,742,467 | A | * | 5/1988 | Messerich et al. | 717/114 |
| 5,339,419 | A | * | 8/1994 | Chan et al. | 717/147 |
| 5,371,747 | A | * | 12/1994 | Brooks et al. | 714/38 |
| 5,659,753 | A | * | 8/1997 | Murphy et al. | 717/147 |
| 5,860,004 | A | * | 1/1999 | Fowlow et al. | 717/109 |
| 5,923,880 | A | * | 7/1999 | Rose et al. | 717/145 |
| 5,933,642 | A | * | 8/1999 | Greenbaum et al. | 717/140 |
| 6,149,318 | A | * | 11/2000 | Chase et al. | 717/131 |
| 6,151,701 | A | * | 11/2000 | Humphreys et al. | 717/130 |
| 6,161,200 | A | * | 12/2000 | Rees et al. | 714/38 |
| 6,442,660 | B1 | | 8/2002 | Henerlau et al. | |
| 6,687,899 | B1 | * | 2/2004 | Shann | 717/162 |
| 6,708,330 | B1 | * | 3/2004 | Moberg et al. | 717/158 |
| 6,802,060 | B1 | * | 10/2004 | Shann | 717/162 |
| 6,839,893 | B1 | * | 1/2005 | Bates et al. | 717/124 |
| 6,886,156 | B1 | * | 4/2005 | McCormack | 717/136 |

OTHER PUBLICATIONS

TITLE: Relocating Machine Instructions by Currying, author: Ramsey, ACM, 1996.*

* cited by examiner

Primary Examiner—Chameli C. Das
(74) Attorney, Agent, or Firm—Fish & Richardson P.C.

(57) ABSTRACT

A method of assembling executable instructions includes mapping a first file scope symbol table for a first source code file being assembled, the first file scope symbol table including a reference for each symbol declaration within each corresponding section of code, determining nested sections of code included in the first source code file, mapping a nested scope symbol table for each determined nested section of code, with each nested scope symbol table including a reference for each symbol declaration within each corresponding section of code and assembling a portion of an executable instruction that corresponds to a symbol reference included in a coded instruction, the portion of the executable instruction based on a symbol mapped by one of the symbol tables.

32 Claims, 6 Drawing Sheets

```
;; main.s
;;
        .export a,b,c
        .export first_pkt,last_pkt

;;;;;;;;;;type declarations;;;;;;;;;;

;; a packet header data structure
head    .struct
type    .byte           ; packet type indicator
length  .byte           ; packet data length
address .short          ; a 16 bit packet address
        .endstruct ;; a packet data structure
pckt    .struct
hdr     .head           ; the packet header
data    .byte   ?*48    ; up to 48 byes of payload data
check   .byte           ; a checksum byte
        .endstruct
```

FIG. 4

```
;;;;;;;;;;start of data segment;;;;;;;;;;
            .dseg   data
52a  packet_buffers.pckt   ? * 32   ; storage for 32 packets
     first_pkt             .short   ; pointer to first packet
     last_pkt              .short   ; pointer to last packet
     check                 .byte    ; buffer for checksum calculation ;;;;;;;;;;start of code segment;;;;;;;;;;
     .cseg   run
     .dreg32   a, b, c              ; global registers
     ...
     ;;;; a local region
     .begin
     .dreg32   x, y, z              ; some local registers
     ...
     .end
     ;;;; end of local region
     ...
58 — .pointer i2 @pckt              ; register i2 points at a "pckt" struct
59a— ldr16   d7,[i2,#2]             ; load command using explicit integer offset
59b— ldr16   d7,i2->hdr.data        ; load command using symbolic field names
     ...
```

FIG. 4 (Continued)

SYMBOLIC ASSEMBLY LANGUAGE

TECHNICAL FIELD

This application relates to assembly language programs.

BACKGROUND

A set of assembly language instructions may be used to specify the actions to be performed by a computer processor during execution of a program that corresponds to those instructions. Assembly language instructions refers to instructions that are "human readable", i.e., written with alpha-numeric words and symbols, for example: "COMPARE A,B", or "ADD R1,R2". An assembler program is used to convert the set of assembly language instructions into a corresponding set of binary instructions ("machine language instructions") that are executable by a specific computer processor. The format of the machine language instructions included in the executable program are specific to the architecture of the computer processor that will be used to execute the program.

DESCRIPTION OF THE DRAWINGS

FIG. 4 is a more complete source code listing corresponding to a source code file shown in FIG. 3.

DESCRIPTION

Figure 1:
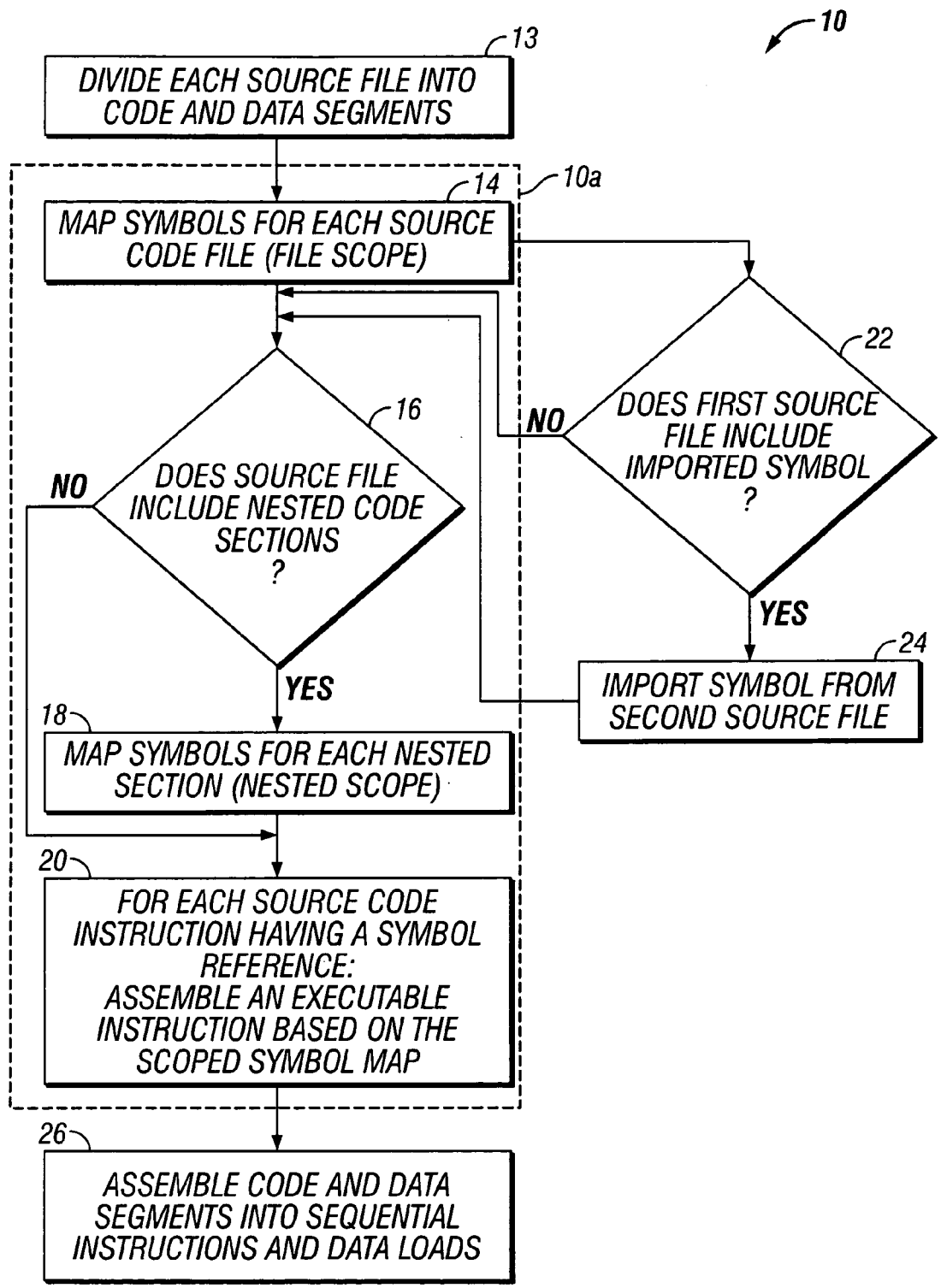
FIG. 1 is a flowchart showing a process for assembling source code instructions into executable instructions.

Referring to FIG. 1, a process 10 includes a main set of actions 10a (shown with solid blocks 14, 16, 18 and 20) that are performed to assemble executable instructions from source code instructions that may include symbolic declarations and references (hereafter referred to as "symbolic assembly language"). In more detail, symbolic assembly language refers to an assembly level instruction that includes a symbol declaration used to declare a symbolic name that corresponds to a memory location, and/or a register, for example. Process 10 "maps" the referenced symbol to the previously declared symbol, i.e., cross-referencing the declared symbol to a binary representation (e.g., a binary representation of the location in memory and/or a register corresponding to the symbol declared). For a subsequent reference to the declared symbol, process 10 uses the symbol map to determine the binary representation of the referenced symbol, and includes that binary representation of the symbol as part of an executable instruction. Furthermore, each source code file may include sections of code that are recognized during the performance of process 10 as having separate name spaces for the symbols declared and/or referenced in those sections (referred to as "lexically scoped" sections of code). In this case, symbols included in each lexically scoped section of code may be mapped to different binary representations in the executable program. In more detail, a symbol declared and/or referenced in a first lexically scoped section of code may be re-used in a second lexically scoped section of code and be mapped to a different binary representation in the executable program.

When performing the main set of actions 10a, process 10 begins by mapping (14) symbol declarations at a highest scoping level for each source code file ("file scope"). Process 10 determines (16) if a source code file includes any nested code sections, and if the file does include a nested code section, process 10 maps (18) any symbol declarations included in each nested section of code ("nested scope"). Finally, for each source code instruction that includes a symbolic reference, process 10 assembles (20) an executable instruction using the lexically scoped symbol mappings. Process 10 may include optional actions (22) and (24), and/or (13) and (26), which are shown with dashed boxes and dashed lines in FIG. 1, as will be explained.

Mapping symbolic declarations according to lexically scoped section of codes allows the use of symbolic names declared in a first section of code or data to be referenced in subsequent sections of code or data, or referenced in other source code files. The use of symbolic assembly language makes it easier for a programmer to read and/or debug source code files since symbolic names are more readily understood. As an example, symbolic names may be used in place of numerical (integer) offsets to indicate a specific data item within a set of memory locations. The determination of lexically scoped sections of code during assembly process 10 also provides the opportunity for a programmer to verify that each symbol declaration is correct. During the performance of assembly process 10, a determination is made of the symbolic declarations for all of the instructions included in all source code files being assembled. This provides a programmer the ability to review the symbolic information for an entire executable program.

Figure 2:
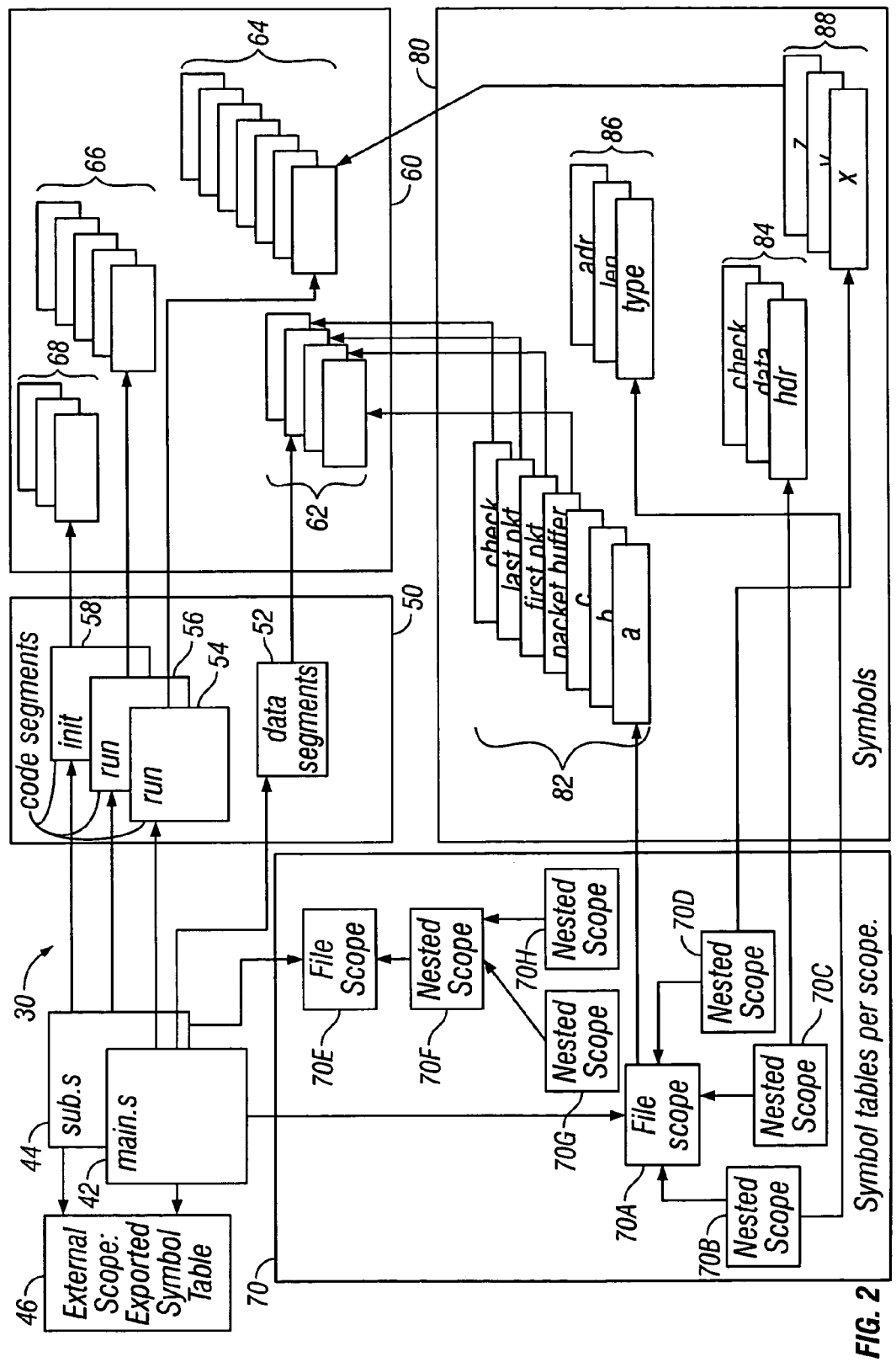
FIG. 2 is a block diagram depicting the mapping of symbols during the performance of the process of FIG. 1.
Figure 3:
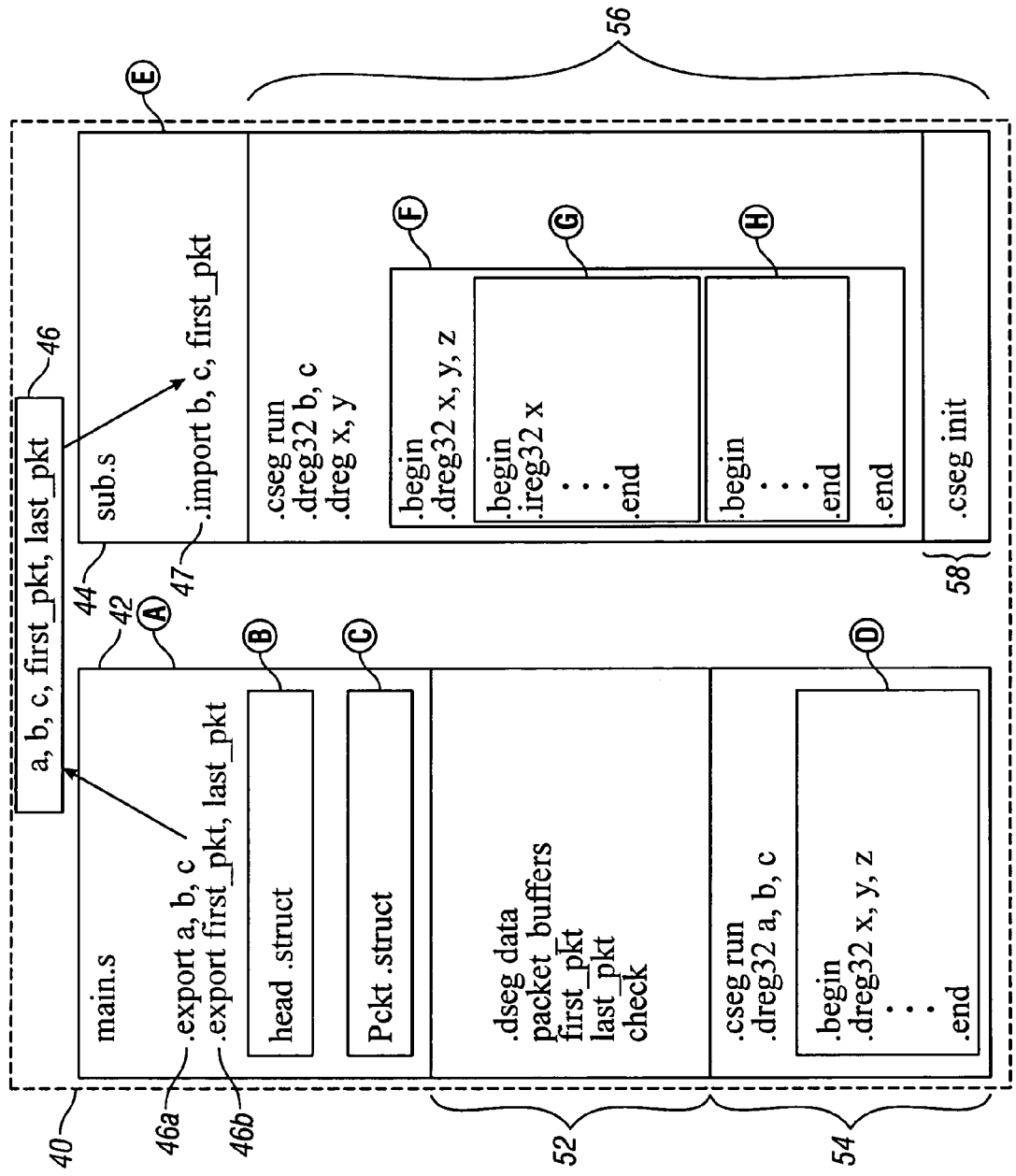
FIG. 3 is a partial source code listing corresponding to the blocks shown in FIG. 2.

Referring to FIG. 2, an example 30 is shown that corresponds to the performance of assembly process 10, i.e., showing the mapping of symbols 80 during an assembly of executable instructions 60 from symbolic assembly language source code files 42 and 44. Referring to FIG. 3, a partial source code listing 40 of source code files 42 and 44 is shown. The source code listing includes assembly level instructions having symbolic declarations and references. During the performance of process 10, specific code sections A–H, included in source code files 42 and 44, are determined and mapped as lexically scoped regions 70. Symbol tables 70A–70H are used to map symbolic declarations contained within each determined code sections A–H, respectively. Each symbol table 70A–70H includes a cross-reference of each symbol 80 declared within a determined code section to a memory location or register, for example. For each symbolic reference included in an assembly level instruction symbol tables 70A-70H are used to map to the binary representation of the symbol 80, which is included as a portion of an executable instruction or data item 60. As shown in this example, symbol tables 70A–70D map sets of symbols 82, 84, 86 and 88, respectively, that are declared in corresponding code sections A–D that are included in source code files 42. Similarly, symbol tables 70E–70H map sets of symbols that are declared in corresponding code sections E–H in source code file 44.

Still referring to FIGS. 2 and 3, assembly process 10 maps all symbolic declarations between each set of ".begin" and ".end" instructions as the beginning and end, respectively, of a lexically scoped region of symbols. For example, code sections F, G and H are mapped with separate symbol tables 70F, 70G and 70H, respectively (see FIG. 2). During the performance of process 10, symbol tables 70A–70H may also be mapped to each other in a 'nested' (hierarchical) structure that reflects the nested scoping regions of code sections contained within other code sections. For example, symbols declared in code section G, will be mapped by symbol table 70G. However, code section G is within code section F, therefore symbol table 70G will be nested below symbol table 70F, to reflect that code section G is within code section F. During assembly process 10, symbols that are referenced within a first determined code section will be mapped by the symbols declared within that section, and if the referenced symbol was not declared within that section, the symbol table in the next highest scoping region will be used to map the referenced symbol, and so forth.

In an embodiment, as depicted in FIG. 1, assembly process 10 includes optional actions (13) and (26). In this case, process 10 divides (13) each source code file 42 and 44 into code segments and/or data segments 50, and assembles (26) each of the instructions included in each code or data segment into a corresponding set of executable instructions and data memory initialization values 60. As an example, as shown in FIGS. 2 and 3, the beginning of each code segment 54, 56 and 58 is defined by a ".cseg" command followed by one or more instructions. Also shown in FIG. 3, the beginning of a data segment 52 is defined by a ".dseg" command. The end of a code segment or a data segment may be defined by a subsequent code segment command, a subsequent data segment command, or the end of a source file. Therefore, during the performance of process 10, which includes optional actions (13) and (26), process 10 divides source code files 42 and 44 into code segments 54, 56 and 58 and data segment 52. Process 10 assembles (26) instructions within each code segment 52, 54 and 56 into sequentially executable instruction sets 64, 66 and 68, respectively. Similarly, process 10 assembles (26) all of the data declarations included in data segment 52 into a set of data items 62 that will be stored in memory locations of a processor executing the assembled instructions 64, 66 and 68.

In an embodiment, assembly process 10 includes optional actions (22) and (24). In this case, process 10 determines (22) if there is a symbolic reference in an instruction in a first source code file that is declared in a second source file that need to be 'imported' to assemble that first instruction. If there is a symbol to be imported, process 10 imports (24) that symbol from a second source code file in order to map that symbol. For example, as shown in FIG. 3, ".export" commands 46a and 46b, and ".import" command 47 are recognized during assembly process 10 and cause the export of symbol declarations from one file and import of those declared symbols, respectively, from one source file 42 to another source file 44.

As shown in FIG. 2, in an embodiment of process 10, an external scope symbol table 46 that corresponds to symbols that are exported from a first source code file is produced. External scope symbol table 46 may then be used to map a symbol imported to a second source code file.

Also shown in FIGS. 2 and 3 is an example of a data segment declaration section 52. Data segment 52 includes a ".dseg data" declaration instruction followed by data item declarations "packet_buffers", "first_pkt", "last_pkt" and "check". During performance of process 10, the data item declarations are assembled to data items 62 that will be stored in a memory of the processor executing the assembled program 60.

Also shown in FIG. 2 are data structure declarations in code sections B and C that may also be lexically scoped. The use of data structure declarations in symbolic assembly language will be explained below in connection to another embodiment.

Referring to FIG. 4, in an embodiment of symbolic assembly language, source code file 42 includes assembly language "structs", i.e. declarations of data structures that are used to describe blocks of data symbolically. A struct is typically used to organize variables of different types and/or sizes. Data structures are advantageous because the use of data structure symbolic names makes it easier for a programmer to understand and debug source code files, as will be explained.

As shown in the following example (Example 1), a struct declaration includes the name of the struct followed by one or more symbolic field names each associated with a specific data size (the data size of each field may vary). As shown in Example 1, in between a ".struct" and ".endstruct" commands, there are symbolic field name declarations each associated with a data size, in this example a struct called "head" includes three symbol names "type", "length" and "address":

Example 1

| head | .struct | ; Struct declaration named 'head'. |
|------|---------|-------------------------------------|
| type | .byte | ; 'Type' field one byte long. |
| length | .byte | ; 'Length' field one byte long. |
| address | .short | ; 'Address' field two bytes long. |
| | .endstruct | ; End of struct declaration. |

Data structures cannot be read or written with a single instruction, instead, struct data variables are accessed one field at a time. After a struct is declared, subsequent instructions may use the symbolic field names of the declared struct as offsets into the struct. In an embodiment of assembly process 10, each struct declaration is mapped as a lexically scoped name space. Therefore, field names included in a declared struct may be re-used in subsequent code or data instructions.

As shown in FIG. 4, two examples of struct declarations are included in code sections B and C. Within code sections B and C, each ".struct" and ".endstruct" instruction defines the beginning and end, respectively, of a data structure. Struct declarations create symbol definitions and associated data fields, however, struct declarations do not define the data to be entered into those fields. Data declarations within a data segment are typically used to place data into struct fields. As shown in data segment 52, the declaration "packet_buffers.pckt" 52a declares an array of 32 structs of type "pckt" (declared earlier in code section C). In this example, "?*32" indicates that there are 32 structs of this type to be included in the array.

Each struct declaration section, ".struct" and ".endstruct" are interpreted by process 10 as the beginning and end, respectively, of a lexically scoped region, for the symbols declared within each struct. Lexical scoping of structs allows symbols declared within a struct to be re-used outside of the lexical scope of the struct. In more detail, a later code or data segment can re-use the struct field names in a second scoping region. In this case the re-use of a struct field name within a second scoping region causes the 'over-loading' of the referenced field name. The ability to re-use symbols from a declared struct makes the code far more readable to a programmer. Furthermore, symbolic names may be used as offsets to index into an array of memory locations instead of using integer offsets.

As an example, as shown in FIG. 4, a pointer load command 58, loads an index register "i2" with the starting address of a "PCKT" struct declared in code section C. A conventional load instruction 59*a* depicts the use of an integer offset to indicate a data item within struct ".pckt" (and referenced by register i2). In an embodiment of symbolic assembly language, a second load instruction 59*b* depicts the use of a symbolic name ".hdr.data" as the offset to indicate the same data item within the same struct ".pckt".

Conventional assembly processes typically produce object files during an interim stage of the assembly process. That is, during a conventional assembly process, object files are created that represent parsed source code that may have unresolved references to external data items or code locations. The object files may then be included in a library of object files. One or more of the object files in the library may be linked with other object files before the executable code file is assembled.

In an embodiment of process 10, executable instructions 60 are assembled from multiple source files 42 and 44 without the use of an intermediate object file. In more detail, process 10 assembles an executable file 60 that represents all of the assembler instructions from the multiple source files 42 and 44. The assembler translates multiple source files directly into internal data structures (as depicted in FIG. 2) and then links them to create an executable program. This eliminates the need for separate intermediate files thus keeping the assembler simple, but still supports the use of multiple source code files which makes the source code more readable and manageable for a programmer.

The described embodiments of assembler process 10 are applicable to the assembly of code required to operate a network processor. Network processors may function as packet crossbars, i.e. receiving data packets and header packets that contain data and information related to data, respectively. The network processor may forward each data packet received to the appropriate destination or process the data packet. Therefore, the previously described code examples which included data structures for "head" and "pckt" would be useful to a program executed in a network processor.

Figure 5:
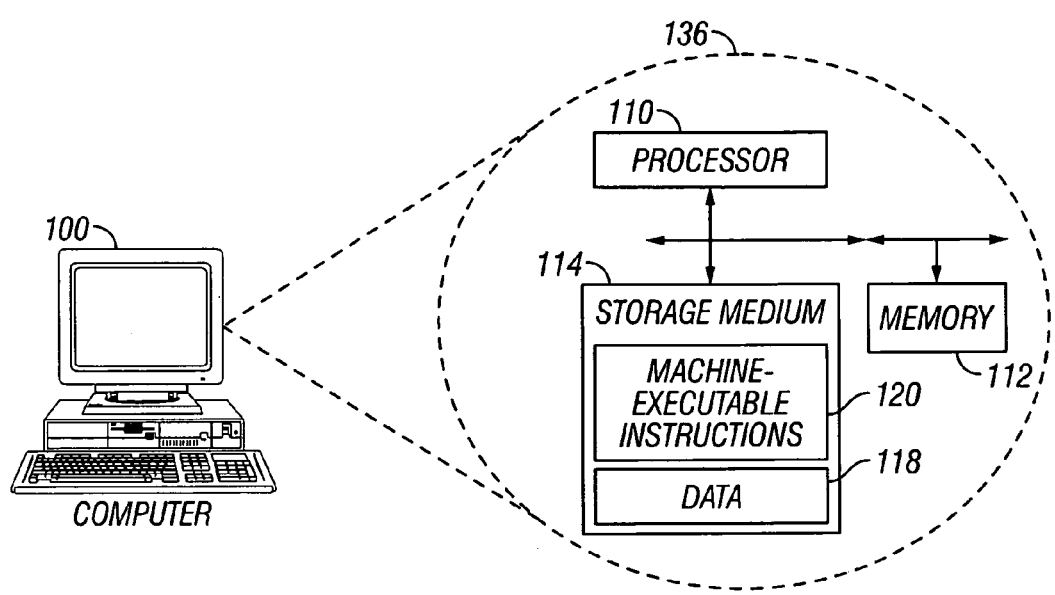
FIG. 5 is a block diagram of computer hardware on which the process of FIG. 1 may be implemented.

FIG. 5 shows a computer system 100 on which process 10 may be implemented. Computer system 100 includes a processor 110, a memory 112, and a storage medium 114 (see view 136). Storage medium 114 stores data 118 for machine-executable instructions 120 that are executed by processor 110 out of memory 112 to perform assembly process 10.

Although a personal computer is shown in FIG. 5, process 10 is not limited to use with the hardware and software of FIG. 3. It may find applicability in any computing or processing environment. Process 10 may be implemented in hardware, software, or a combination of the two. Process 5 may be implemented in computer programs executing on programmable computers or other machines that each include a processor, a storage medium readable by the processor (including volatile and non-volatile memory and/or storage components), at least one input device, and one or more output devices. Program code may be applied to data entered using an input device (e.g., a mouse or keyboard) to perform process 10 and to generate output information.

Each computer program may be stored on a storage medium/article (e.g., CD-ROM, hard disk, or magnetic diskette) that is readable by a general or special purpose programmable computer for configuring and operating the computer when the storage medium or device is read by the computer to perform process 10. Process 10 may also be implemented as a machine-readable storage medium, configured with a computer program, where, upon execution, instructions in the computer program cause a machine to operate in accordance with process 10.

The invention is not limited to the specific embodiments described above. Other embodiments not described herein are also within the scope of the following claims.

What is claimed is:

1. A machine-implemented method of assembling executable instructions in a programmable machine including a processor, comprising;
    mapping a first file scope symbol table for a first source code file being assembled, the first file scope symbol table including a reference for each symbol declaration within each corresponding section of code included in the first source code file;
    determining nested sections of code included in the first source code file;
    mapping a nested scope symbol table for each determined nested section of code, with each nested scope symbol table including a reference for each symbol declaration within each corresponding section of code; and
    assembling a portion of an executable instruction that corresponds to a symbol reference included in a coded instruction included in the first source code file, the portion of the executable instruction based on a symbol mapped by one of the symbol tables;
    wherein the first source code file comprises assembly language instructions.

2. The method of claim 1, wherein a first nested scope symbol table for a first determined section of code is also mapped to a second symbol table for a second section of code.

3. The method of claim 2, further comprises:
    determining whether a symbol referenced in an instruction in the first nested section of code is mapped in the first nested symbol table.

4. The method of claim 3, wherein if the symbol is determined to be mapped in the first nested symbol table the portion of the executable instruction is based on the mapping of the first nested symbol table.

5. The method of claim 3, wherein if the symbol is determined not to be in the first nested symbol table then the symbol is mapped based on the mapping of the second symbol table.

6. The method of claim 3, further comprises:
    mapping a second file scope symbol table for a second source code file being assembled, the second file scope symbol table including a reference for each symbol declaration within each corresponding section of code;
    determining nested sections of code included in the second source code file;
    mapping a nested scope symbol table for each determined nested section of code in the second source code file, with each nested scope symbol table including a reference for each symbol declaration within each corresponding section of code in the second source code file; and
    assembling a portion of an executable instruction that corresponds to a symbol reference included in a coded instruction in the second source code file, the portion of the executable instruction based on a symbol mapped by one of the symbol tables.

7. The method of claim 2, further comprising:
    dividing each source code file into code segments and data segments, wherein assembling further comprises:
        assembling sequential sets of executable instructions corresponding to each code segment; and assembling sequential sets of data items corresponding to each data segment.

8. The method of claim 2, wherein a symbol declaration comprises declaring a data structure having a data structure name, at least one symbol field name and an associated field data size.

9. The method of claim 8, wherein the symbols included in each data structure declaration and in each data structure reference are lexically scoped, and wherein assembling a portion of an executable instruction that includes a data structure field name reference further comprises:
assembling the portion of the executable instruction that corresponds to the data structure symbol reference based on the lexical scope of the code section which contains the symbol reference.

10. The method of claim 2, further comprising:
exporting a first symbol declaration from a first source code; and
importing the first symbol declaration from the first source code file to the a second source code file.

11. The method of claim 10, further comprising:
mapping an external scope symbol table based on the exported symbol declaration, wherein the external scope symbol table is used to map the imported symbol declaration of the second source file.

12. The method of claim 1, further comprising:
translating multiple assembly language source code files, including the first source code file, directly into internal data structures, and linking the internal data structures to create an executable program, without using an intermediate object file.

13. A system configured to assemble executable instructions, comprising:
a processor;
a memory; and
a storage medium accessible by the processor to store machine-executable instructions, which when accessed by the processor cause the processor to;
map a first file scope symbol table for a first source code file being assembled, the first file scope symbol table including a reference for each symbol declaration within each corresponding section of code included in the first source code file;
determine nested sections of code included in the first source code file;
map a nested scope symbol table for each determined nested section of code, with each nested scope symbol table including a reference for each symbol declaration within each corresponding section of code included in the first source code file; and
assemble a portion of an executable instruction that corresponds to a symbol reference included in a coded instruction included in the first source code file, the portion of the executable instruction based on a symbol mapped by one of the symbol tables;
wherein the first source code file comprises assembly language instructions.

14. The system of claim 13, wherein a first nested scope symbol table for a first determined section of code is also mapped to a second symbol table for a second section of code.

15. The system of claim 14, further comprises instructions that when executed cause the processor to:
determine whether a symbol referenced in an instruction in the first nested section of code is mapped in the first nested symbol table.

16. The system of claim 15, wherein if the symbol is determined to be mapped in the first nested symbol table the portion of the executable instruction is based on the mapping of the first nested symbol table.

17. The system of claim 15, wherein if the symbol is determined not to be in the first nested symbol table then the symbol is mapped based on the mapping of the second symbol table.

18. The system of claim 15, further comprises instructions that when executed cause the processor to:
map a second file scope symbol table for a second source code file being assembled, the second file scope symbol table including a reference for each symbol declaration within each corresponding section of code;
determine nested sections of code included in the second source code file;
map a nested scope symbol table for each determined nested section of code in the second source code file, with each nested scope symbol table including a reference for each symbol declaration within each corresponding section of code in the second source code file; and
assemble a portion of an executable instruction that corresponds to a symbol reference included in a coded instruction in the second source code file, the portion of the executable instruction based on a symbol mapped by one of the symbol tables.

19. The system of claim 14, further comprising instructions causing the processor to;
divide each source code file into code segments and data segments, wherein assembling further comprises:
assemble sequential sets of executable instructions corresponding to each code segment; and
assemble sequential sets of data items corresponding to each data segment.

20. The system of claim 14, wherein a symbol declaration comprises declaring a data, structure having a data structure name, at least one symbol field name and an associated field data size.

21. The system of claim 20, wherein the symbols included in each data structure declaration and in each data structure reference are lexically scoped, and wherein assembling a portion of an executable instruction that includes a data structure field name reference further comprises:
assemble the portion of the executable instruction that corresponds to the data structure symbol reference based on the lexical scope of the code section which contains the symbol reference.

22. The system of claim 14, further comprising instructions causing the processor to:
export a first symbol declaration from a first source code; and
import the first symbol declaration from the first source code file to a second source code file.

23. The system of claim 22, further comprising instructions causing the processor to:
map an external scope symbol table based on the exported symbol declaration, wherein the external scope symbol table is used to map the imported symbol declaration of the second source file.

24. The system of claim 14, further comprising the storage medium accessible by the processor to store machine-executable instructions, which when accessed by the processor cause the processor to:
translate multiple assembly language source code files, including the first source code file, directly into internal data structures, and link the internal data structures to create an executable program, without using an intermediate object file.

25. A machine-accessible medium, which when accessed results in a programmable machine including a processor, performing operations comprising:
   mapping a first file scope symbol table for a first source code file being assembled, the first file scope symbol table including a reference for each symbol declaration within each corresponding section of code included in the first source code file;
   determining nested sections of code included in the first source code file;
   mapping a nested scope symbol table for each determined nested section of code, with each nested scope symbol table including a reference for each symbol declaration within each corresponding section of code included in the first source code file; and
   assembling a portion of an executable instruction that corresponds to a symbol reference included in a coded instruction included in the first source code file, the portion of the executable instruction based on a symbol mapped by one of the symbol tables;
   wherein the first source code file comprises assembly language instructions.

26. The medium of claim 25, wherein a first nested scope symbol table for a first determined section of code is also mapped to a second symbol table for a second section of code.

27. The medium of claim 26, which when accessed results in a machine performing operations further comprising:
   determining whether a symbol referenced in an instruction in the first nested section of code is mapped in the first nested symbol table.

28. The medium of claim 27, wherein if the symbol is determined to be mapped in the first nested symbol table the portion of the executable instruction is based on the mapping of the first nested symbol table.

29. The medium of claim 27, wherein if the symbol is determined not to be in the first nested symbol table then the symbol is mapped based on the mapping of the second symbol table.

30. The medium of claim 27, which when accessed results in a machine performing operations further comprising;
   mapping a second file scope symbol table for a second source code file being assembled, the second file scope symbol table including a reference for each symbol declaration within each corresponding section of code;
   determining nested sections of code included in the second source code file;
   mapping a nested scope symbol table for each determined nested section of code in the second source code file, with each nested scope symbol table including a reference for each symbol declaration within each corresponding section of code in the second source code file; and
   assembling a portion of an executable instruction that corresponds to a symbol reference included in a coded instruction in the second source code file, the portion of the executable instruction based on a symbol mapped by one of the symbol tables.

31. The medium of claim 25, wherein the machine-accessible medium has stored thereon one or more sequences of instructions.

32. The medium of claim 25, which when accessed results in a machine performing operations further comprising:
   translating multiple assembly language source code files, including the first source code file, directly into internal data structures, and linking the internal data structures to create an executable program, without using an intermediate object file.

* * * * *